(12) United States Patent
Arimoto et al.

(10) Patent No.: US 7,193,786 B2
(45) Date of Patent: Mar. 20, 2007

(54) ZOOM OPTICAL SYSTEM AND IMAGE PICKUP APPARATUS (75) Inventors: Tetsuya Arimoto, Sakai (JP); Makoto Jin, Sakai (JP); Yoshihito Souma, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/436,838

(22) Filed: May 18, 2006

(65) Prior Publication Data

US 2006/0268426 A1 Nov. 30, 2006

(30) Foreign Application Priority Data

May 26, 2005 (JP) ............................. 2005-153686

(51) Int. Cl.
*G02B 15/14* (2006.01)
(52) U.S. Cl. .................. 359/682; 359/684; 359/685; 359/686; 359/715; 359/726; 359/740; 359/781; 359/753
(58) Field of Classification Search ................ 359/680, 359/682–686, 715, 726, 740, 781, 753
See application file for complete search history.

(56) References Cited

U.S. PATENT DOCUMENTS

| 5,717,527 | A | * | 2/1998 | Shibayama | ................... 359/690 |
| 5,999,329 | A | | 12/1999 | Ohtake | ........................ 359/686 |
| 6,654,180 | B2 | | 11/2003 | Ori | ............................ 359/689 |
| 6,728,482 | B2 | * | 4/2004 | Hagimori et al. | ........... 359/689 |
| 6,850,373 | B2 | * | 2/2005 | Mihara et al. | ............... 359/676 |
| 7,079,325 | B2 | * | 7/2006 | Konno | ........................ 359/682 |
| 2003/0197952 | A1 | * | 10/2003 | Nozawa et al. | ............. 359/689 |
| 2003/0206352 | A1 | * | 11/2003 | Mihara et al. | ............... 359/684 |
| 2004/0012704 | A1 | * | 1/2004 | Hagimori et al. | ........... 348/335 |
| 2004/0021783 | A1 | * | 2/2004 | Mihara | ......................... 359/684 |
| 2004/0062535 | A1 | * | 4/2004 | Hagimori et al. | .............. 396/72 |
| 2004/0080632 | A1 | * | 4/2004 | Iwasawa et al. | .......... 348/240.3 |
| 2004/0130647 | A1 | | 7/2004 | Kuba | ......................... 348/335 |
| 2005/0259329 | A1 | * | 11/2005 | Yagyu et al. | ................ 359/676 |

FOREIGN PATENT DOCUMENTS

JP 2004-61675 A 2/2004

* cited by examiner

*Primary Examiner*—Evelyn A. Lester
(74) *Attorney, Agent, or Firm*—Sidley Austin LLP (57) ABSTRACT A zoom optical system according to the present invention is provided with, in order from an object side thereof: a first lens group having a negative refractive power; a second lens group having a positive refractive power; a third lens group having a negative refractive power; and a fourth lens group having a positive refractive power. The zoom optical system moves at least the second lens group and the third lens group for zooming operation from a wide-angle end to a telephoto end. The zoom optical system moves the third lens group for a focusing operation. The first lens group is provided with, in order from the object side of the zoom optical system, a meniscus lens having a negative refractive power whose concave surface faces an image side of the zoom optical system, a reflective optical element, and at least one lens.

10 Claims, 5 Drawing Sheets

ZOOM OPTICAL SYSTEM AND IMAGE PICKUP APPARATUS

This application is based on Japanese Patent Application No. 2005-153686 filed on May 26, 2005 in Japanese Patent Office, the entire context of which is hereby incorporated by reference.

FIELD OF THE INVENTION

The present invention relates to a zoom optical system and an image pickup apparatus having the same, the zoom optical system being used for an electronic image pickup apparatus having an image pickup element for converting an optical image formed on a light receiving surface of an image sensor, such as CCD (Charged Coupled Device) and CMOS (Complementary Metal Oxide Semiconductor).

BACKGROUND OF THE INVENTION

In recent years, with the rise in the number of pixels of the image pickup element, demand for an optical system having a lower error sensitivity, which cannot be easily influenced by manufacturing errors, while maintaining high optical performance with high design flexibility has been growing. Technologies such as a zoom optical system including three lens groups have been proposed in response to the demand. The three lens group zoom optical system comprises lenses having a negative power, positive power and positive power (which is also called refractive power defined by an inverse number of a focal length) in order from an object side.

Further, from the portability and the design points of view, an optical system by which a thin shaped camera body can be designed has been demanded. In response to this demand, proposed conventionally has been a zoom optical system including a first lens having negative power in which a reflecting surface for inflecting an optical path is disposed on the optical path of the zoom optical system.

Further, an optical system has been proposed in which a short length optical system is realized by forming a telephotometry optical system structured by a lens group in which negative power, positive power and negative power lenses are disposed in order from an object side, while making a camera thin by disposing a reflective surface in the first lens group.

Moreover, a zoom optical system structured by lens groups in which negative power, positive power, negative power and positive lenses are disposed in order from an object side where the first and fourth lens groups are fixed has been proposed. The zoom optical system that has four lens groups is suitable for minimizing the size of a zoom optical system.

However, since a focusing operation is executed by the third lens group in the optical system that includes three lens groups, the third lens group moves toward the object side and the distance between the second lens group and the third lens group becomes narrow when the object distance becomes short. Consequently, there is a problem in that it is difficult to make a shortest object distance at a telephoto point in which a moving distance is particularly long.

Further, in order to shorten the closest object distance, it is necessary to set the distance between the second lens group and the third lens group longer when setting an infinite object distance. In this case, as the third lens group approaches the image surface side, it becomes difficult to utilize the third lens group to adequately correct aberration. Further, there is a problem in that the size of the total lens system becomes large when securing the adequate distance between the third lens group and the image surface in order to avoid the problem described above.

In the optical system wherein the camera thickness is made thin by disposing the reflective surface in the first lens group, moving a negative third lens group toward the image surface side makes it possible to realize focusing at close range and to have a structure which can easily shorten the closest object distance. However, there is a problem that since the concave surface of the first surface of the lens located in the most object side is arranged to face to the object side, off-axis aberration occurs and many aspherical surfaces are required to correct the off-axis aberration. Further, there is a problem that the total length of the lens has to be prolonged.

In the optical system including four lens groups, when securing the necessary distance for providing a reflective optical element between the first and second lenses, since the first lens is configured by a negative single lens, off-axis aberration occurs like a case described above. The problem is that in order to correct the off-axis aberration, many aspherical surfaces are required and the total length of the lens has to be prolonged.

SUMMARY OF THE INVENTION

An object of the present invention is to provide a compact size and high performance zoom optical system having an adequately short focal length.

The above problems are solved by providing a zoom optical system as follows:

A zoom optical system for forming an optical image of an object on an image-sensing surface of an image pickup element, said zoom optical system comprises, in order from an object side thereof: a first lens group having a negative refractive power; a second lens group having a positive refractive power; a third lens group having a negative refractive power; and a fourth lens group having a positive refractive power. The zoom optical system moves at least the second lens group and the third lens group for zooming operation from a wide-angle end to a telephoto end so as to reduce a distance between the first lens group and the second lens group and increase a distance between the third lens group and the fourth lens group. The zoom optical system also moves the third lens group for a focusing operation. The first lens group comprises, in order from the object side of the zoom optical system, a meniscus lens having a negative refractive power whose concave surface faces an image side of the zoom optical system, a reflective optical element, and at least one lens.

It becomes possible to structure an image pickup apparatus having a compact and high performance zoom optical system and an image pickup apparatus having the same while maintaining an adequately shortest focal length by applying the structure of the present invention.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE INVENTION

Embodiments of a zoom optical system of the present invention will be described below by referring to drawings.

Figure 1:
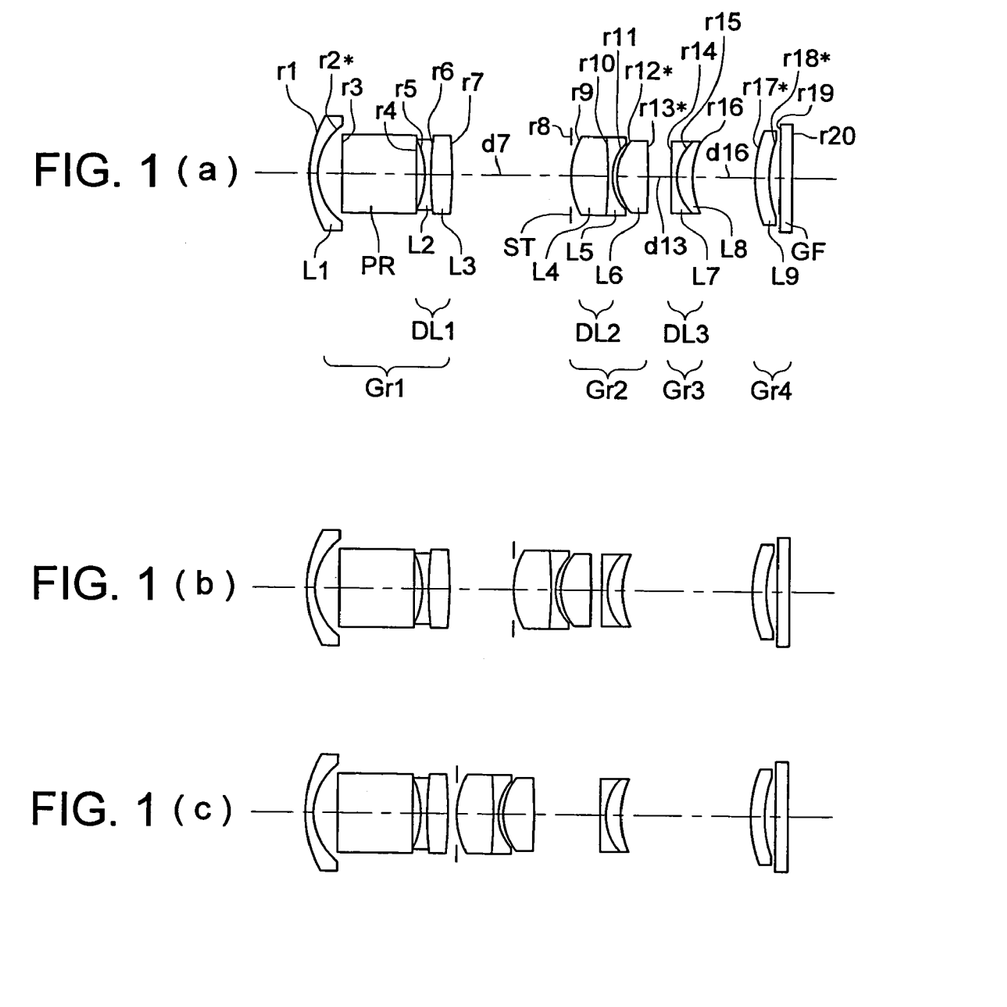
FIGS. 1(a)–1(c) respectively illustrate cross sectional view of a lens arrangement in an example of the embodiment of the present invention.

FIGS. 1(a)–1(c) illustrate cross sectional views of a lens arrangement as an example of the embodiments of the present invention, each of which are respectively in a shortest focusing distance state (W), a middle focusing distance state (M) and a longest focusing distance (T). The shortest focusing distance is also called a wide-angle end and the longest focusing distance is also called a telephoto end, hereinafter. In FIG. 1, a reflective optical element PR denotes, for example, a prism having an internal reflecting surface, which is expressed by a parallel flat plate to express an optical path in a straight line.

The zoom optical system of a numerical example includes a first lens group Gr1 configured by a first lens L1 whose convex surface faces an object side and being a negative meniscus lens; a reflective optical element PR; a first cemented lens DL1 being configured by cementing a second lens L2 having concave surfaces in both sides and a third lens L3 having convex surfaces in both surfaces. The first lens L1, the reflective optical element PR, the first cemented lens DL1, and the third lens L3 are arranged in this order from an object side to an image surface side of the zoom optical system. The first lens group Gr1 has a negative power as a whole system. The zoom optical system further includes a second lens group Gr2 being configured by a diaphragm ST; and a second cemented lens DL2 being configured by cementing a fourth lens L4 having convex surfaces in both sides and a fifth lens L5 having concave surface in both side; and a sixth lens L6 having convex surface in both sides. The diaphragm ST, the second cemented lens DL2, and the sixth lens L6 are arranged in this order from the object side to the image surface side of the zoom optical system. The second lens group Gr2 has a positive power as a whole system. The zoom optical system further includes a third lens group Gr3 configured by a third cemented lens LD3 being configured by cementing a seventh lens L7 being a negative meniscus lens whose convex surface faces an object side and an eighth lens L8 being a positive meniscus lens in which the convex surface faces an object side. The third lens group Gr3 has a negative power as a whole system. The zoom optical system further includes a fourth lens group Gr4 configured by a ninth lens L9 whose convex surface faces an object side. The fourth lens group Gr4 has a positive power as a whole system. The first, second, third and fourth lens groups are arranged in this order from the object side to the image surface side of the zoom optical system.

Further, arranged in an image surface side of the fourth lens group Gr4 of the zoom optical system are an optical low-pass filter, an IR cut filter and a parallel flat plate GF supposed to be a shielding glass of a solid state image pickup element SR.

When the zoom optical system shifts its status from a shortest focusing distance state (W) to a longest focusing distance state (T) through a middle focusing distance state (M), the first lens group Gr1 is fixed against the image surface, the second lens group Gr2 substantially monotonically moves to the object side, the third lens group Gr3 substantially monotonically moves from the shortest focusing distance state (W) to the middle focusing distance state (M) and moves a little bit to the object side, and the fourth lens group Gr4 is fixed against an image surface together with a parallel flat plate GF disposed in the image surface side. Accordingly, when shifting the status from a shortest focusing distance state (W) being a wide-angle end to a longest focusing distance state (T) being a telephoto end, a distance d7 between the first lens group Gr1 and the second lens group Gr2 decreases and a distance d16 between the third lens group Gr3 and the fourth lens group Gr4 increases.

The surface of the image surface side of the first lens L1, two opposite surfaces of the sixth lens L6 and the two opposite surfaces of the ninth lens L9 are aspherical surfaces.

Figure 3:
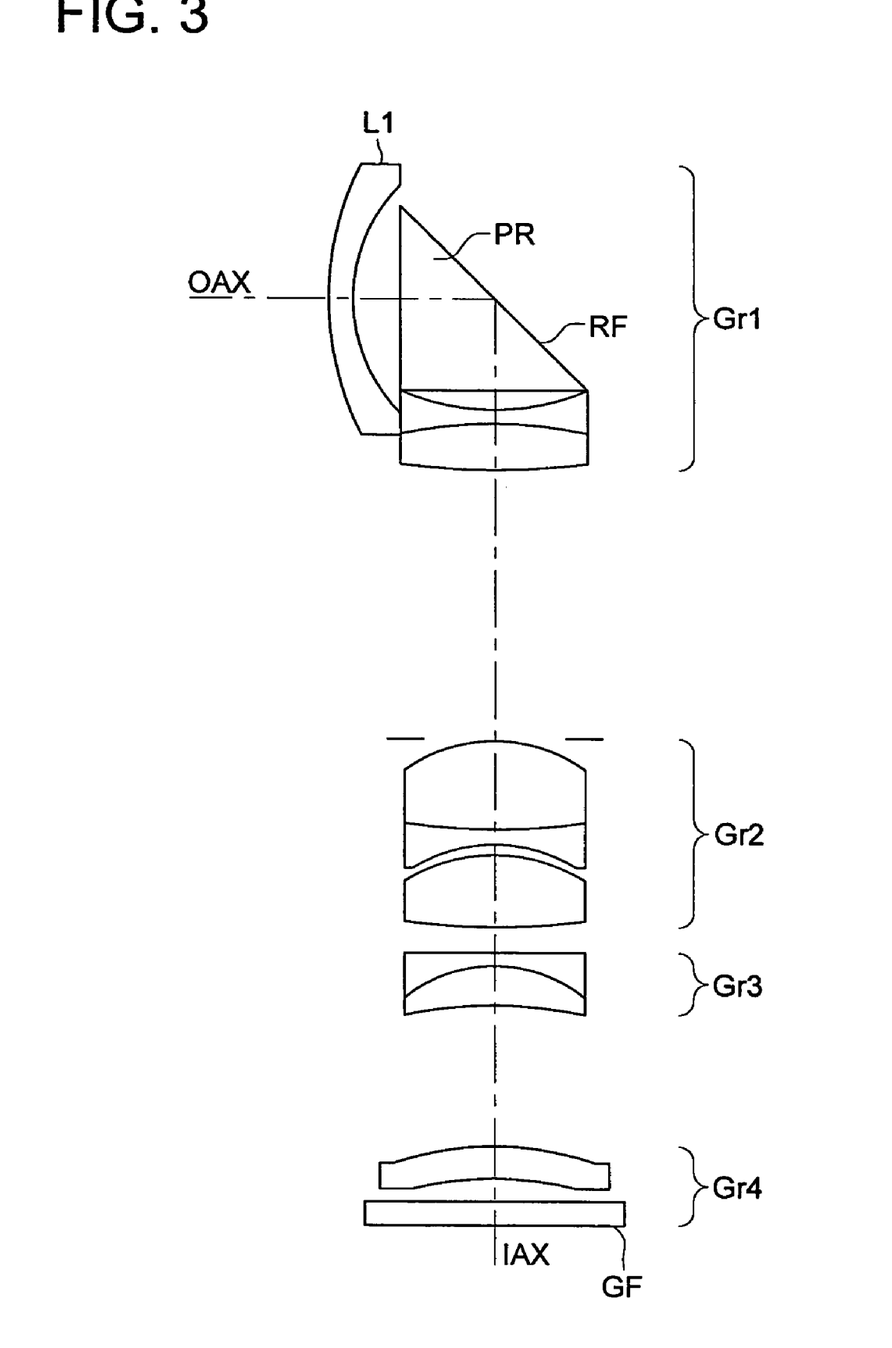
FIG. 3 illustrates a cross sectional view of a lens arrangement of a zoom optical system in an example of the embodiment of the present invention, the zoom optical system being in a state as an example where the zoom optical system is used in the shortest focal length.

FIG. 3 illustrates a cross sectional view showing a lens arrangement of the zoom optical system in a shortest focusing distance state (W), using an internal reflection prism as the reflection prism PR and lies at the state that the optical axis is bent substantially 90° by a reflecting surface RF of the internal reflection prism. As described above, the optical axis of the first lens L1 being a negative meniscus lens whose convex surface faces to an object side (in other words, the optical axis OAX of a object light flux) and the optical axis of the reflective element PR (in other words, an optical axis IAX of an image light flux) form the angle of substantially 90°.

The first lens group Gr1 has a negative power. Accordingly, since the zoom optical system becomes a type having a negative lens group positioned in front, it is easily configured as a retro-focus type structure in a wide focusing distance range. It is easy to realize an image side telecentricity necessary for forming an optical image onto an imaging element.

Further, since an off-axis light flux passing through the first lens group Gr1 comes close to the optical axis, it becomes possible to minimize the lens diameter and, for example, it is possible to minimize the size of the reflecting surface RF at the reflecting surface position.

In the first lens group Gr1, arranged are a negative meniscus lens L1 whose concave surface faces the image side, a reflective optical element PR and at least one lens (the first cemented lens DL1 of the numerical example) in order from the object side.

Further, since the entrance pupil moves toward the object side due to the divergence effect of the negative lens positioned at the most object-side end and the optical path length necessary to bend the optical path becomes short, it becomes possible to make the optical system thin. And it also becomes possible to suppress the occurrence of off-axis aberration since the curvature centers of opposite lens surfaces of the lens L1 come close to the pupil position by using a meniscus lens as the negative lens L1.

The lens arranged closest to the image surface (the first cemented lens DL1 of the numerical example) in the first lens group Gr1 is arranged to have a function to correct the aberration mainly occurred in the first lens group Gr1. Accordingly, from the viewpoint of the power allotment and/or aberration correction, it is preferable that the lens arranged closest to the image surface of the first lens group Gr1 is arranged to be a cemented lens having a negative power.

This lens is a cemented lens in this example. However, a single lens may configure it.

Further, by providing the reflective optical element PR having a reflecting surface RF to bend the optical axis of the object light flux in the first lens group Gr1, it becomes possible to bend the optical axis of the object light flux, for example, at the angle of substantially 90°. As a result, since it is possible that the size of the zoom optical system in the object direction can be made smaller, so that it is substantially the same length from the lens L1 located at the most object-side end to the reflecting surface RF. The optical axis adjacent to the reflecting surface RF can be bent, the zoom optical system of the embodiment in the present invention can be made thin by appearance as shown in FIG. 3.

The reflective optical element can be selected from the group of (a) an internal reflecting prism (the embodiment of the present invention), (b) a surface-reflecting prism, (c) an internal reflecting plate mirror and (d) a surface-reflecting mirror. However, from the viewpoint of the compactness, an internal reflecting prism is preferable. When the total length of the lens is limited, it is preferable that the air-conversion distance from the first lens L1 to the third lens L3 is short from the viewpoint of aberration correction. Accordingly, it is possible to secure a real distance necessary to bend the optical axis by using the internal reflecting prism with an optically shorter surface distance.

The reflecting surface RF may not be an all-perfect total reflection surface. It may be acceptable that the reflectance of a part of the reflecting surface is appropriately adjusted to branch the object light flux and a part of the object light flux may be guided to the sensor for measuring lights and measuring distance to the object. Further, the reflectance of the entire reflecting surface may be adjusted so that the object light flux may be branched for the usage of an optical finder.

When zooming from a wide-angle end to a telephoto end, it is preferable that the first lens group Gr1 is fixed. This is mainly because it can lighten the mechanical workload. For example, the first lens group Gr1 is provided with an internal reflecting prism which has a reflecting surface RF for bending an optical axis substantaiilly 90°., and the first lens group Gr1 is moved for zooming. This requires a complicated mechanism for supporting and moving the first lens group Gr1, and is shifts an image capturing range for close-up image capturing, both of which are problems.

In the zoom optical system of the embodiment, when zooming from the wide-angle end to the telephoto end, the distance d7 between the first lens group and the second lens group is decreased. The details will be described below.

Since the zoom optical system of the embodiment of the present invention is a zoom optical system having a negative lens group positioned in front as described above, an adequate back focus (an air conversion length from the lens positioned closest to the image surface to the image surface) can be obtained even when the wide angle having the shortest focal length is set. However, since the second lens group Gr2 has a positive power, in order to achieve the minimization of total length of the zoom optical system, it is necessary to achieve the minimization of the total length of the zoom optical system at the telephoto end while trying to move the second lens group Gr2 away from the first lens group Gr1 when taking account of the effect described above. Accordingly, it is necessary to set the synthesized power to positive by moving the second lens group Gr2 having a strong convergence effect close to the first lens group at the telephoto end.

In the zoom optical system of the type having a negative lens group positioned in front, the zoom optical system is configured so that the positive power of the second lens group Gr2 most aggressively contributes to zooming. Accordingly, the aberration, particularly chromatic aberration on the optical axis, which is caused in the second lens group, fluctuates over a large range as the zoom optical system zooms. By configuring the second lens group Gr2 only with the second cemented lens group LD2 comprising a fourth lens L4 having positive power and a fifth lens L5 having negative power, and a sixth lens L6 being bi-aspherical lens, it becomes possible to simplify the supporting mechanism of the second lens group Gr2 while effectively correcting the chromatic aberration on the optical axis.

Further, by providing a diaphragm ST at the most object-side end in the second lens group Gr2, the size of the first lens group Gr1 can be suppressed and a compact sized zoom optical system can be obtained.

Further, it becomes possible to effectively optimize the correction balance of spherical aberration and curvature of the field in the second lens group Gr2 by providing the sixth lens L6 positioned at the farthest from the diaphragm ST and closest to the image surface and transmitting the off-axis light flux at the higher position of the lens, and by forming the sixth lens L6 into an aspherical lens having two opposite surfaces in aspherical shapes such that, the farther from an optical axis each surface is, the weaker a refractive power of each surface is.

In the zoom optical system of the embodiment, when conducting variable magnification from the wide-angle end to the telephoto end, the distance d16 between the third lens group Gr3 and the fourth lens group Gr4 is increased. The details will be described below.

At the wide-angle end in the zoom optical system of the embodiment, negative distortion occurred in the first lens group Gr1 can be eliminated by moving the negative third lens group Gr3 to the image surface side in the direction of the fourth lens group Gr4 where the height of off-axis light flux is high.

On the other hand, it becomes possible to secure the long focal length without prolonging the zoom optical system of the embodiment by positioning the third lens group Gr3 on the object-side end in the direction moving away from the fourth lens group Gr4, where the height of an on-axis light flux is high, and forming a telephoto optical system having positive and negative power together with the second lens group Gr2.

In the zoom optical system of the embodiment of the present invention, the third lens group is moved for a focusing operation. This operation will be described below.

When an object position approaches from infinity to a near plane, in order to focus the object by moving the second lens group Gr2 having a positive power, it is necessary to move the second lens group Gr2 to the object side along the optical axis. Since the direction in which the second lens group Gr2 is moved for focusing is the same as the direction in which the second lens group Gr2 is moved for zooming from the wide-angle end to the telephoto end, the moving range of the second lens group Gr2 becomes wide and it becomes difficult to minimize the total lens length. Further, the workload of an actuator of the second lens group Gr2 becomes large. Further, securing the distance between the first lens group Gr1 and the second lens group Gr2 is a-constraint when designing a zoom optical system.

On the other hand, when focusing by applying the third lens group Gr3, since the focusing operation can be performed by moving the third lens group Gr3 to the image surface side along the optical axis, it becomes possible to limit the moving range of the third lens group Gr3. As a result, securing the moving range of the third lens group Gr3 does not become a constraint when designing the zoom optical system and it becomes possible to simplify the mechanism for moving the third lens group Gr3.

Further, it becomes possible to suppress the curvature of the field and magnification chromatic aberration fluctuation occurred when focusing, and to simplify the lens supporting mechanism by configuring the third lens group Gr3 by a single element of a third cemented lens DL3, which is configured by a seventh lens L7 having negative power and an eighth lens L8 having positive power in order from the object side.

In general, when configuring an image pickup apparatus by combining an image taking lens and an image pickup element such as CCD, since an off-axis light flux (off-axis principal ray) is obliquely directed onto the CCD and an actual aperture ratio decreases, the light amount becomes insufficient and causes a shading phenomenon. In this case, it is necessary to put off the exit pupil from the image surface and to make the angle formed by the principal ray emitted from the image taking lens and the optical axis small (securing the telecentricity). Therefore, in the zoom optical system of the embodiment according to the present invention, the exit pupil is put away from the image surface and telecentricity is secured by the fourth lens group Gr4 having positive power.

Further, it is preferable that the fourth lens group Gr4 is fixed in a zooming operation from the wide-angle end to the telephoto end or a focusing operation. It becomes possible to suppress the aberration fluctuation along with the zooming operation and the fluctuation of pupil position by fixing the fourth lens group Gr4 for the zooming operation. It also becomes possible to simplify the lens supporting mechanism and minimize the lens barrel by fixing the fourth lens group Gr4 for the zooming operation.

Next, a conditional expression to satisfy the zoom optical system of the embodiment according to the present invention will be described below.

With respect to the second lens group Gr2, it is preferable that the following conditional formula (1) be fulfilled.

$$0.5 < fasp/f2 < 1.5 \qquad (1)$$

Where fasp denotes a focal length of the lens positioned closest to the image surface in the second lens group Gr2 and f2 denotes a focal length of the second lens group 2.

The conditional formula (1) defines the workload ratio of the power of the aspherical surface of the sixth lens L6 positioned closest to the image surface in the second lens group Gr2 against the power of the second lens group Gr2. It is possible to obtain the refractive power of the second lens group Gr2, which is necessary to minimize the size of the optical system while maintaining the optimum correction balance of the spherical aberration and curvature of the field of the second lens group by satisfying the conditional formula (1). When exceeding the lower limit of the conditional formula (1), the power of the aspherical surface strongly comes out and the flexibility of aberration correction by the aspherical surface becomes low. On the other hand, when exceeding the upper limit of conditional formula (1), the power of the aspherical surface becomes lower and aspherical aberration in the second lens group Gr2 tends to occur.

With respect to the second lens group Gr2, it is preferable that the following conditional formula (1A) be fulfilled.

$$0.8 < fasp/f2 < 1.2 \qquad (1A)$$

Where fasp denotes a focal length of the lens positioned closest to the image surface in the second lens group Gr2 and f2 denotes a focal length of the second lens group 2.

Although each lens group, which configures the zoom optical system of the embodiment according to the present invention, comprises only a refraction type lens (a lens in which deflection is performed at the boundary surface having different refractive indexes) for deflecting the incident light flux by refraction, other lens group types may be employed. For example, each lens group may be configured by a diffraction type lens in which an incident light flux is deflected by a diffraction, a refraction-diffraction hybrid type lens in which an incident light flux is deflected by the combination of a diffraction effect and a refraction effect and a refractive index distribution lens for diffracting an incident light flux by the refractive index distribution in the medium.

Figure 4:
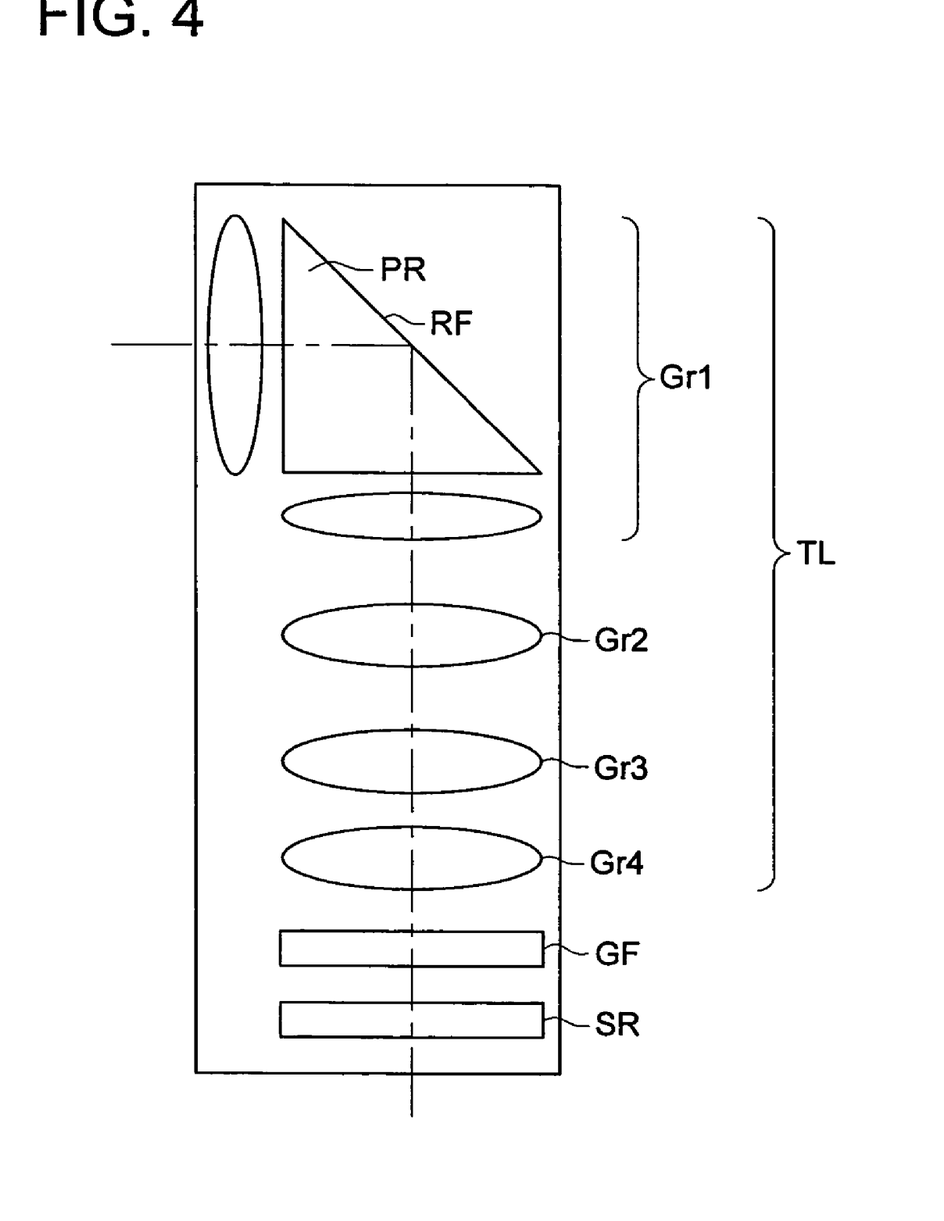
FIG. 4 illustrates a conceptual diagram of an image pickup apparatus having a zoom optical system of an example of the embodiments of the present invention.

An image pickup apparatus of the embodiment according to the present invention, for example, as illustrated in FIG. 4, comprises in order from the object side, a zoom optical system TL for forming an optical image of an object with zooming ability, an optical low-pass filter, an IR cut-filter, a parallel flat plate GF supposed to be a shielding glass of a solid state image pickup element and an image pickup element SR for converting the optical images formed by the zoom optical system TL into an electrical signal.

The zoom optical system TL includes a first lens group Gr1 having a reflective optical element PR, a second lens group Gr2 following to the first lens group Gr1, a third lens group Gr3 and a fourth lens group Gr4. It becomes possible to configure a thin image pickup apparatus by bending the optical axis substantially 90° at the reflecting surface RF of the reflective optical element PR.

The optical low-pass filter has a specific cut-off frequency to adjust the space frequency characteristic and to eliminate color moiré occurred in the image pickup apparatus. The optical low-pass filter in the embodiment according to the present invention is a double refraction type low pass filter configured by laminating a double refraction material of a crystal in which a crystal axis is adjusted to the predetermined direction and a wavelength plate for changing the polarization surface. With regard to the optical low pass filter, a phase type low pass filter for achieving the necessary optical cut-off frequency by a diffraction effect may also be adopted.

The image pickup element SR comprises CCD having a plurality of pixels, which convert the optical images formed by the zoom optical system in the embodiment according to the present invention into an electrical signal by using the CCD. The generated signal in the image pickup element SR is recorded as digital image signal into memory (semiconductor memory and optical discs) after predetermined digital signal processing and/or image compression processing are/ is applied to the generated signal if necessary. Sometimes, the generated signal is transmitted to other apparatus through cable or converted into infrared ray signals. CMOS (Complementary Metal-oxide Semiconductor) type image sensor may be used instead of CCD.

When an image pickup surface is a rectangular like a CCD, the object light may be bent by the reflecting element either in the direction parallel to the short edge of the image-sensing surface or parallel to the long edge direction. When bending the optical axis into the direction parallel to the short edge of the image-sensing surface, the image pickup apparatus can be structured in a thinner shape than when bending the optical axis in the direction parallel to the long edge of the image-sensing surface. In this case, since particularly the effective aperture of the surface adjacent the image pickup surface comes close to the image pickup surface or its approximation shape, it becomes possible to minimize the image pickup optical system by adopting an external form having a rectangular shape centering on the optical axis instead of a circle shape.

Figure 5:
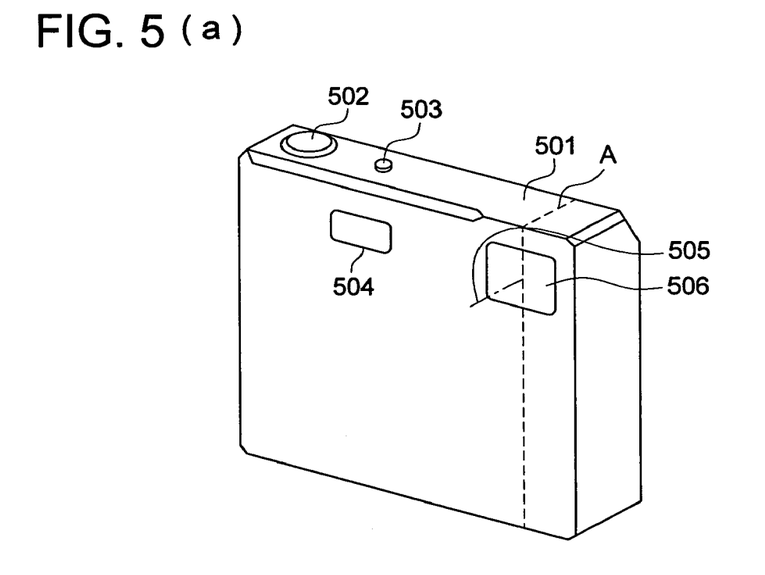
FIGS. 5(a) and 5(b) respectively illustrate a digital camera employing an image pickup apparatus as an example of the embodiment of the present invention.

The image pickup apparatus described above is a main component of a camera, which is installed into or attached outside of a digital camera, a video camera, a personal computer, a mobile computer, a cellular telephone and a PDA (a Personal Digital Assistance). It becomes possible to make information processing apparati, such as the digital camera and the personal computer as described above, small and/or thin by applying the component of the embodiment according to the present invention to the image pickup apparatus. FIG. 5(a) illustrates an example an appearance of a digital camera having a component of an image pickup apparatus of an embodiment of the invention. FIG. 5(b) illustrates a cross sectional view of the digital camera viewed at the position A as shown in FIG. 5(a), the FIG. 5(b) showing a digital camera having the image pickup apparatus of an embodiment according to the present invention.

EXAMPLE

The configuration of a zoom optical system installed into the image pickup apparatus of the embodiment according to the present invention will be concretely described by using construction data and aberration diagrams.

The numerical example described here corresponds to the lens configuration, which is shown in the embodiment described above and illustrated in FIG. 1. Li (i=1, 2, 3, ... ) denotes that the lens is positioned at i-th order from the object side; DL1 denotes a first cemented lens configured by a second lens L2 and a third lens L3; DL2 denotes a second cemented lens configured by a fourth lens L4 and a fifth lens L5; and DL 3 denotes a third cemented lens configured by a seventh lens L7 and an eight lens L8.

In the numerical example, ri (i=1, 2, 3, ... ) denotes the radius of curvature (mm) of the surface positioned at i-th order from the object side; di (i=1, 2, 3, ... ) denotes the surface distance between the surfaces of corresponding lenses on the axis (mm) positioned at i-th order from the object side; Ni (i=1, 2, 3, ... ) denotes a refractive index against the d-line of i-th order lens and vi (i=1, 2, 3, ... ) denote Abbe's constant against the d-line of i-th order lens.

In the numerical example, axial surface distances d7, d13 and d16 denote the variable distance values at the shortest focal length state (an wide-angle end: W)—the middle focusing distance (middle: M)—the maximum focal length (a telephoto end: T), in this format. A focal length of the total system (f: mm) and F number (FNO) corresponding to each focal length state (W), (M) and (T) will be shown together with the other data.

Further, in the numerical example, the surface where the radius of curvature ri to which "*" is attached denotes that the surface has a refraction optical surface including aspherical surface or a surface having a refraction effect equivalent to the aspherical surface. The surface shape of the aspherical surface is expressed by the following formula (AS).

$$Z(h) = r - (r^2 - \epsilon \cdot h^2)^{1/2} + \Sigma A_i \cdot h^i \quad \text{(AS)}$$

Where, h denotes the height from an optical axis in a perpendicular direction to the optical axis; Z(h) denotes a displacement (from the surface top) in the optical axis direction at height h; r denotes a paraxial radius of curvature of an aspherical surface; $\epsilon$ denotes an elliptic coefficient; $A_i$ denotes an i-th aspherical surface coefficient; and $h^i$ denotes a symbol showing i-th power of h. The aspherical surface data in the numerical example will be shown together with other data.

The character "E" in the data of the numerical example denotes a exponent of the numeral, for example, 1.0E-02 means $1.0 \times 10^{-2}$.

TABLE 1

[Numerical example 1]
f = 6.449–10.899–18.380 (mm)
Fno = 2.80–3.74–4.81

| | Curvature radius (mm) | | Distance on axis (mm) | | Refractive index; Nd | | Abbe's constant; vd |
|---|---|---|---|---|---|---|---|
| r1 | 14.589 | | | | | | |
| | | d1 | 0.80 | N1 | 1.772500 | v1 | 49.36 |
| r2* | 7.224 | | | | | | |
| | | d2 | 2.10 | | | | |
| r3 | ∞ | | | | | | |
| | | d3 | 7.85 | N2 | 1.846660 | v2 | 23.78 |
| r4 | ∞ | | | | | | |
| | | d4 | 0.74 | | | | |
| r5 | −9.497 | | | | | | |
| | | d5 | 0.60 | N3 | 1.658440 | v3 | 50.85 |
| r6 | 20.051 | | | | | | |
| | | d6 | 1.88 | N4 | 1.846660 | v4 | 23.78 |
| r7 | −40.656 | | | | | | |
| | | d7 | 11.666–5.999–0.879 | | | | |
| r8 | 0.000 | | | | | | |
| | | d8 | 0.10 | | | | |
| r9 | 7.242 | | | | | | |
| | | d9 | 3.80 | N5 | 1.804200 | v5 | 46.50 |
| r10 | −43.872 | | | | | | |
| | | d10 | 0.70 | N6 | 1.846660 | v6 | 23.78 |
| r11 | 7.724 | | | | | | |
| | | d11 | 0.50 | | | | |
| r12* | 6.218 | | | | | | |
| | | d12 | 3.00 | N7 | 1.530480 | v7 | 55.72 |
| r13* | −21.764 | | | | | | |
| | | d13 | 1.208–0.752–5.305 | | | | |
| r14 | 38.413 | | | | | | |
| | | d14 | 0.70 | N8 | 1.804200 | v8 | 46.50 |
| r15 | 5.834 | | | | | | |
| | | d15 | 1.70 | N9 | 1.672700 | v9 | 32.17 |
| r16 | 17.606 | | | | | | |
| | | d16 | 6.006–12.129–12.695 | | | | |
| r17* | 16.445 | | | | | | |
| | | d17 | 1.40 | N10 | 1.530480 | v10 | 55.72 |
| r18* | 84.056 | | | | | | |
| | | d18 | 0.95 | | | | |
| r19 | ∞ | | | | | | |
| | | d19 | 1.00 | N11 | 1.516800 | v11 | 64.20 |
| r20 | ∞ | | | | | | |

| | Aspherical surface coefficients | | | | |
|---|---|---|---|---|---|
| | r2 | r12 | r13 | r17 | r18 |
| $\epsilon$ | 1.00000 | 1.00000 | 1.00000 | 1.00000 | 1.00000 |
| A4 | −1.18076E−04 | −7.63255E−04 | 7.99518E−04 | 1.38848E−03 | 2.94979E−03 |
| A6 | −3.09889E−06 | −7.53673E−07 | 1.02229E−05 | −4.65630E−05 | −1.10309E−04 |
| A8 | 1.41896E−07 | −9.56874E−04 | | −3.89395E−07 | |
| A10 | −4.33947E−09 | | | | |

In this case, the value of conditional expression becomes fasp/f2=1.0.

Figure 2A:
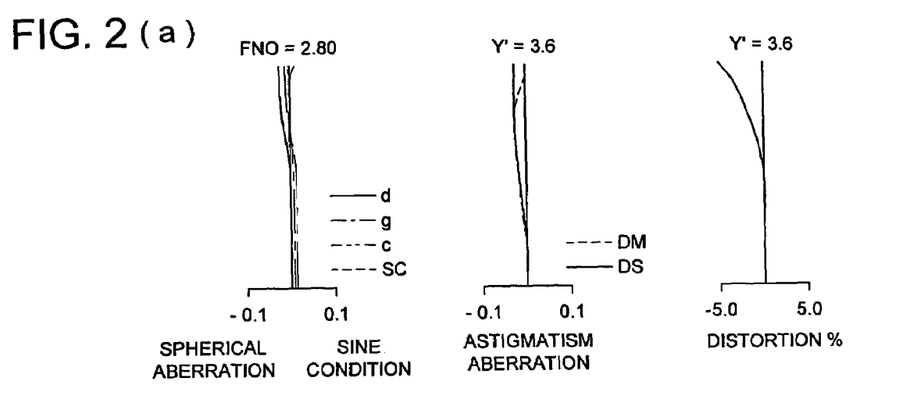
FIGS. 2(a)–2(c) respectively illustrate aberration diagrams of the numerical example in an infinite focusing state.
Figure 2B:
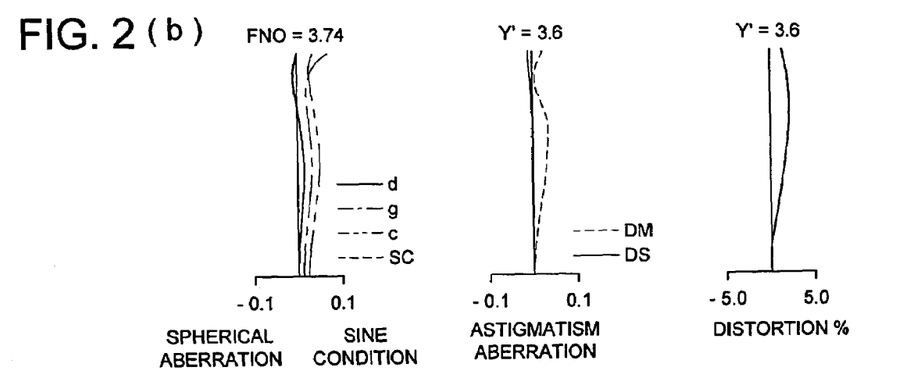
Figure 2C:
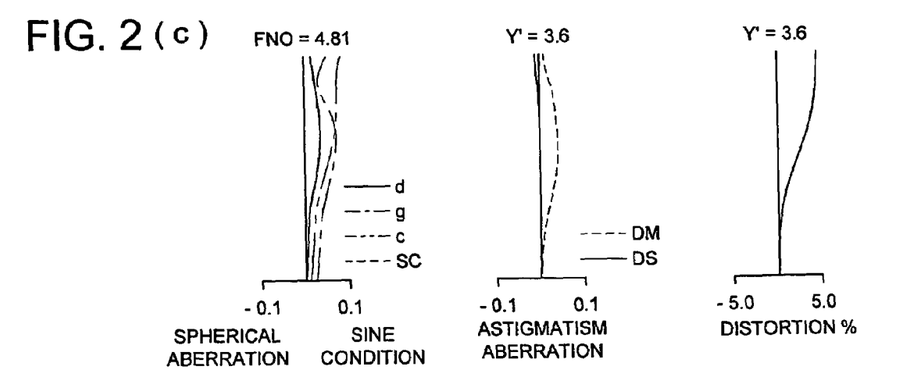

FIGS. 2(a)–2(c) illustrate aberration diagrams of the numerical example. FIG. 2(a) illustrates the shortest focal length state (W); FIG. 2(b) illustrates the middle focal length state; and FIG. 2(c) illustrates aberration in the longest focal length (T), in the infinite focusing state of the zoom optical system of the embodiment. Each drawing illustrates a spherical aberration diagrams, an astigmatism drawing and a distortion aberration diagrams in order from left side.

In each spherical aberration diagrams, a solid line d denotes a d-line, a dashed line g denotes a g-line, a two short dashed line c denotes a c-line and SC denotes an amount of the offence against the sine condition (mm).

In each astigmatism aberration diagrams, a solid line DS denotes a sagittal surface and a dotted line DM denotes each astigmatism aberration amount (mm) against the d-line on a meridional surface.

In each distortion aberration diagrams, a solid line denotes distortion (%) against a d-line.

The vertical axis of the spherical aberration diagrams denotes F number (FNO) of light flux, the vertical axis in an astigmatism aberration diagrams and a distortion drawing denote respectively the maximum image height Y'.

While the preferred embodiments of the present invention have been described using specific terms, such description is for illustrative purposes only, and it is to be understood that changes and variations may be made without departing from the spirit or scope of the appended claims.

What is claimed is:

1. A zoom optical system for forming an optical image of an object on an image-sensing surface of an image pickup element, said zoom optical system comprising, in order from an object side thereof:
    a first lens group having a negative refractive power;
    a second lens group having a positive refractive power;
    a third lens group having a negative refractive power; and
    a fourth lens group having a positive refractive power,
    wherein the zoom optical system moves at least the second lens group and the third lens group for zooming operation from a wide-angle end to a telephoto end so as to reduce a distance between the first lens group and the second lens group and increase a distance between the third lens group and the fourth lens group,
    wherein the zoom optical system moves the third lens group for a focusing operation,
    wherein the first lens group comprises, in order from the object side of the zoom optical system, a meniscus lens having a negative refractive power whose concave surface faces an image side of the zoom optical system, a reflective optical element, and at least one lens.

2. The zoom optical system as claimed in claim 1, wherein the second lens group has an aspherical lens arranged closest to an image surface of the zoom optical system, said aspherical lens having two opposite surfaces in aspherical shapes such that a farther position from an optical axis on each of the opposite surfaces provides a smaller refractive power.

3. The zoom optical system as claimed in claim 2, wherein the second lens group fulfills the following conditional formula:

$0.5 < fasp/f2 < 1.5$ where fasp is a focal length of the lens closest to the image surface in the second lens group, and
f2 is a focal length of the second lens group.

4. The zoom optical system as claimed in claim 1, wherein the second lens group comprises, in order from an object side of the zoom optical system, a diaphragm, a cemented lens and a bi-aspherical lens, said cemented lens including a lens having a positive refractive power and a lens having a negative refractive power.

5. The zoom optical system as claimed in claim 1, wherein the third lens group comprises a cemented lens including a lens having a negative refractive power and a lens having a positive refractive power.

6. An image pickup apparatus comprising:
    a zoom optical system which forms an optical image of an object;
    an image pickup element which converts the optical image formed by the zoom optical system into electrical signal;
    said zoom optical system comprises, in order from an object side thereof:
    a first lens group having a negative refractive power;
    a second lens group having a positive refractive power;
    a third lens group having a negative refractive power; and
    a fourth lens group having a positive refractive power,
    wherein the zoom optical system moves at least the second lens group and the third lens group for zooming operation from a wide-angle end to a telephoto end so as to reduce a distance between the first lens group and the second lens group and increase a distance between the third lens group and the fourth lens group,
    wherein the zoom optical system moves the third lens group for a focusing operation,
    wherein the first lens group comprises, in order from an object side of the zoom optical system, a meniscus lens having a negative refractive power whose concave surface faces an image side of the zoom optical system, a reflective optical element, and at least one lens.

7. The image pickup apparatus as claimed in claim 6, wherein the second lens group has an aspherical lens arranged closest to an image surface of the zoom optical system, said aspherical lens having two opposite surfaces in aspherical shapes such that a farther position from an optical axis on each of the opposite surfaces provides a smaller refractive power.

8. The image pickup apparatus as claimed in claim 7, wherein the second lens group fulfills the following conditional formula:

$$0.5 < fasp/f2 < 1.5$$

where fasp is a focal length of the lens closest to the image surface in the second lens group, and
f2 is a focal length of the second lens group.

9. The image pickup apparatus as claimed in claim 6, wherein the second lens group comprises, in order from an object side of the zoom optical system, a diaphragm, a cemented lens and a bi-aspherical lens, said cemented lens including a lens having a positive refractive power and a lens having a negative refractive power.

10. The image pickup apparatus as claimed in claim 6, wherein the third lens group comprises a cemented lens including a lens having a negative refractive power and a lens having a positive refractive power.

* * * * *